3,104,239
2 - (THIAMORPHOLINOETHOXY) - ETHYL PHENO-
THIAZINE - 10 - CARBOXYLATE AND SALT
THEREOF
Martin A. Davis, Montreal, Quebec, Canada, assignor to
American Home Products Corporation, New York,
N.Y., a corporation of Delaware
No Drawing. Filed July 27, 1961, Ser. No. 127,149
3 Claims. (Cl. 260—243)

This invention relates to a pharmacologically-active
thiamorpholine derivative and its acid salts. It is also
concerned with the procedure by which the new com-
pounds may be prepared.

In base form my new pharmacologically-active com-
pound characterized by antitussive and local anaesthetic
activities, as well as by a low order of toxicity, the com-
pound 2-(thiamorpholinoethoxy)ethyl phenothiazine-10-
carboxylate, has the following structural formula:

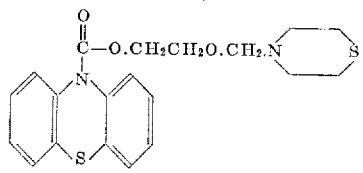

My invention is also concerned with acid addition salts
of the base with pharmaceutically acceptable acids, and
particularly with the hydrochloride salt, i.e. 2-(thiamor-
pholinoethoxy)ethyl phenothiazine - 10 - carboxylate hy-
drochloride. As a local anaesthetic the active compound
in the form of one of its water-soluble pharmaceutically
acceptable salts might be administered in a 1–2% aqueous
solution for topical application.

As an antitussive medication it may be administered
in the form of its water-soluble salts in solid dosage forms
such as tablets or capsules containing an excipient such
as, for example, lactose, a disintegrating agent such as,
for example, starch, and a lubricant such as, for example,
magnesium stearate, or in liquid preparations such as
syrups, which may advantageously contain expectorant
and secretolytic additives, such dosage forms to contain
from 10 to 50 mg., of the active compound per dosage
unit.

In preparing my new chemical compounds, phenothi-
azine-10-carboxylic acid chloride and 2-(thiamorpholino-
ethoxy)ethanol are interacted in an acid-binding medium,
preferably pyridine. The acid salt, such as the hydro-
chloride of 2 - (thiamorpholinoethoxy)ethyl phenothia-
zine-10-carboxylate, is prepared by treating the base with
an acid, preferably under anhydrous conditions.

The starting material, 2-(thiamorpholinoethoxy)eth-
anol, may be prepared by heating 2-(chloroethoxy)eth-
anol with thiamorpholine in a solvent such as ethanol.

Details of the procedures by which the new chemical
compounds may be prepared are given in the illustrative
examples which follow:

EXAMPLE 1

2-(Thiamorpholinoethoxy)Ethanol

A solution of thiamorpholine (22.0 g., 0.21 mole)
[prepared by the reduction of 3-thiamorpholone by the
method of A. H. Sommers and B. W. Horrom, J. Amer.
Chem. Soc., 76, 1187 (1954)] and 2-(chloroethoxy)
ethanol (12.4 g., 0.10 mol.) in absolute ethanol (75
ml.) was heated under reflux for 19 hrs. The solution
was then evaporated, the residue diluted with dry ether
and the precipitate filtered off. The filtrate was evapo-
rated and distilled to give 14.8 g. (77.5% yield) of 2-
(thiamorpholinoethoxy)ethanol, B.P. 118–122° C./0.45
mm.; $n_D^{24.5}$ 1.5180.

The hydrochloride of this compound was prepared by
treatment of an ethereal solution of the base with gaseous
hydrogen chloride. Recrystallization from isopropanol
gave shining leaflets of M.P. 157–158° C.

Analysis confirmed the empiric formula $C_8H_{18}NO_2SCl$.
Required: Cl, 15.57; S, 14.08%. Found: Cl, 15.18;
S, 14.13%.

EXAMPLE 2

2-(Thiamorpholinoethoxy)Ethyl Phenothiazine-
10-Carboxylate

To a stirred slurry of phenothiazine-10-carboxylic acid
chloride (17.0 g., 0.065 mole) in dry pyridine (25 ml.)
was added dropwise a solution of 2-(thiamorpholino-
ethoxy)ethanol (12.4 g., 0.065 mole). The mixture was
then stirred at room temperature for one hour, followed
by three-quarters of an hour at 85° C. It was then
cooled and added to ice and water. Sodium carbonate
solution was then added to make the mixture alkaline
and the oil obtained was collected. It was washed by
decantation with several portions of cold water, taken
up in benzene and the organic phase was again washed
with water to remove the pyridine. Evaporation left
a dark, very viscous oil which was dissolved in carbon-
tetrachloride-hexane mixture and treated with several
portions of charcoal to remove most of the color. The
yellow solution was now evaporated to give a solid of
M.P. 67–68° C. (16.7 g.), which, after recrystalliza-
tion from isopropanol-petroleum ether (B.P. below 40°
C.), gave a purified sample of 2-(thiamorpholinethoxy)
ethyl phenothiazine-10-carboxylate; M.P. 71–740 C. (de-
comp.).

Analysis confirmed the empiric formula $C_{21}H_{24}N_2O_3S_2$.
Required: C, 60.55; H, 5.81; S, 15.39%. Found: C,
60.87; H, 5.44; S, 15.57%.

EXAMPLE 3

2-(Thiamorpholinoethoxy)Ethyl Phenothiazine-
10-Carboxylate Hydrochloride

A solution of the base described in Example 2 in ether
was treated with gaseous hydrogen chloride. The re-
sulting precipitate on recrystallization from methanol-
ether gave a sample of 2-(thiamorpholinoethoxy)ethyl
phenothiazine-10-carboxylate hydrochloride as rosettes
of fine needles, M.P. 190–192° C. (decomp.).

Analysis confirmed the empiric formula $C_{21}H_{25}ClN_2O_3S_2$.

Required: C, 55.68; H, 5.56; Cl. 7.83; N, 6.19%.
Found: C, 55.76; H, 5.26; Cl. 7.72; 7.78; N, 6.27, 6.26%.

As compared with the corresponding morpholino
analogue, which is disclosed in U.S. Patent No. 2,778,824,
the compound 2-(thiamorpholinoethoxy)ethyl pheno-
thiazine-10-carboxylate has about ten times the local
anaesthetic action, as well as a lower toxicity. The
therapeutic indices of the thiamorpholine compound are
therefore better than those for its oxygen analogue.

Expressed in terms of the free bases, the respective
values for the two compounds are tabulated below.

|   | 2-(Thiamor-pholinoethoxy) ethyl pheno-thiazine-10-carboxylate | 2-(Morpho-linoethoxy) ethyl pheno-thiazine-10-carboxylate |
|---|---|---|
| $LD_{50}$ (Mice) | 477±13.6 | 133±0.37 |
| Antitussive $ED_{50}$ (Cats) | 3.67±0.7 | 2.2±0.55 |
| Therapeutic Index $(LD_{50})/(ED_{50})$ | 103 | 60.5 |
| Local Anaes. (percent conc. giving 50% Anaesthesia; rabbits) | 0.042±0.010 | 0.45±0.095 |
| Therapeutic Index | 11400 | 296 |

I claim:
1. A compound selected from the group which consists of 2-(thiamorpholinoethoxy)ethyl phenothiazine-10-carboxylate and its hydrochloride salt.
2. 2-(thiamorpholinoethoxy)ethyl phenothiazine-10-carboxylate.
3. 2-(thiamorpholinoethoxy)ethyl phenothiazine-10-carboxylate hydrochloride.

References Cited in the file of this patent

UNITED STATES PATENTS

| | | |
|---|---|---|
| 2,778,824 | Von Seemann | Jan. 22, 1957 |
| 2,951,077 | Myers et al. | Aug. 30, 1960 |
| 2,989,529 | Schuler | June 20, 1961 |

FOREIGN PATENTS

| | | |
|---|---|---|
| 813,861 | Great Britain | May 27, 1959 |
| 1,036,259 | Germany | Aug. 14, 1958 |

OTHER REFERENCES

Chappel et al.: Canadian J. Biochem. and Physiol., volume 36, pages 475–81 (1958).

UNITED STATES PATENT OFFICE
CERTIFICATE OF CORRECTION

Patent No. 3,104,239                          September 17, 1963

Martin A. Davis

It is hereby certified that error appears in the above numbered patent requiring correction and that the said Letters Patent should read as corrected below.

Column 2, line 32, for "71-740 C." read -- 71-74° C. --.

Signed and sealed this 31st day of March 1964.

(SEAL)
Attest:
ERNEST W. SWIDER

Attesting Officer

EDWARD J. BRENNER

Commissioner of